United States Patent
Kashibuchi et al.

(10) Patent No.: US 8,463,028 B2
(45) Date of Patent: Jun. 11, 2013

(54) IMAGE PROCESSING APPARATUS, IMAGE PROCESSING METHOD, AND PROGRAM

(75) Inventors: Yoichi Kashibuchi, Tokyo (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 12/719,423

(22) Filed: Mar. 8, 2010

(65) Prior Publication Data

US 2010/0231994 A1 Sep. 16, 2010

(30) Foreign Application Priority Data

Mar. 10, 2009 (JP) ................................. 2009-056317

(51) Int. Cl.
*G06K 9/00* (2006.01)

(52) U.S. Cl.
USPC .......................................... 382/165; 358/505

(58) Field of Classification Search
None
See application file for complete search history.

(56) References Cited

U.S. PATENT DOCUMENTS

| | | | | |
|---|---|---|---|---|
| 6,035,059 A | * | 3/2000 | Kurosawa et al. | 382/164 |
| 6,411,731 B1 | * | 6/2002 | Saito | 382/173 |
| 6,681,372 B2 | * | 1/2004 | Yajima | 715/268 |
| 6,826,306 B1 | * | 11/2004 | Lewis et al. | 382/187 |
| 2002/0095444 A1 | * | 7/2002 | Mantaro | 707/515 |
| 2004/0190772 A1 | * | 9/2004 | Constantin et al. | 382/175 |
| 2010/0232700 A1 | * | 9/2010 | Kashibuchi et al. | 382/187 |

FOREIGN PATENT DOCUMENTS

| | | |
|---|---|---|
| CN | 1165604 A | 11/1997 |
| CN | 101226594 A | 7/2008 |
| JP | 05-274468 A | 10/1993 |
| JP | 06-282676 A | 10/1994 |
| JP | 09-319805 A | 12/1997 |
| JP | 2007-219682 A | 8/2007 |
| JP | 2008-145611 A | 6/2008 |
| JP | 2008145611 A | * 6/2008 |

OTHER PUBLICATIONS

U.S. Appl. No. 12/719,458, filed Mar. 8, 2010, Yoichi Kashibushi.

* cited by examiner

*Primary Examiner* — Barry Drennan
*Assistant Examiner* — Andrew Moyer
(74) *Attorney, Agent, or Firm* — Canon U.S.A., Inc. IP Division

(57) ABSTRACT

An apparatus includes a reading unit configured to read image data, a recognition unit configured to recognize a color of a handwritten portion designating a region in the image data and to recognize processing associated with the color of the handwritten portion, a display unit configured to display the recognized color and a content of the processing associated with the color, and a changing unit configured to change an association between the recognized color and the recognized content of the processing.

15 Claims, 13 Drawing Sheets

FIG.2A

| INVOICE |
|---|

TO:[NAME]
[COMPANY NAME]

DATE:
INVOICE NO.

XXX CORPORATION
[NAME]:
[ADDRESS]: 11-11-11 YY, ZZ, TOKYO
[ZIP CODE]:
[TEL]:         [FAX]:

MAKE ALL CHECKS PAYABLE
TO XXX CORPORATION.
THANK YOU FOR YOUR BUSINESS.

| SUBJECT | |
|---|---|
| TOTAL AMOUNT | YEN |

DEPOSIT TO:    BANK         BRANCH
ORDINARY ACCOUNT/CHECKING ACCOUNT
PAYMENT TERMS

| CODE | ITEM/DESCRIPTION | QUANTITY | UNIT | UNIT PRICE | LINE TOTAL |
|---|---|---|---|---|---|
| | | | | | |
| | | | | | |
| | | | | | |
| | | | | | |
| | | | | | |
| | | | | | |
| | | | | | SUB TOTAL |
| | | | | | SALES TAX |
| | | | | | TOTAL |

| REMARKS | |
|---|---|

| SEAL | SEAL | SEAL |
|---|---|---|

| XXX CORPORATION |
|---|

FIG.2B

INVOICE

TO:[NAME]
[COMPANY NAME]

DATE:
INVOICE NO.

XXX CORPORATION
[NAME]:
[ADDRESS]: 11-11-11 YY, ZZ, TOKYO
[ZIP CODE]:
[TEL]: [FAX]:

MAKE ALL CHECKS PAYABLE
TO XXX CORPORATION.
THANK YOU FOR YOUR BUSINESS.

| SUBJECT | | — 31 |
| TOTAL AMOUNT | YEN | — 32 |

DEPOSIT TO: BANK BRANCH
ORDINARY ACCOUNT/CHECKING ACCOUNT
PAYMENT TERMS

| CODE | ITEM/DESCRIPTION | QUANTITY | UNIT | UNIT PRICE | LINE TOTAL |
|---|---|---|---|---|---|
| | | | | | |
| | | | | | |
| | | | | | |
| | | | | | |
| | | | | | |
| | | | | | |
| | | | | SUB TOTAL | |
| | | | | SALES TAX | |
| | | | | TOTAL | |

REMARKS

SEAL | SEAL | SEAL  — 33

XXX CORPORATION

FIG.2C

| INVOICE | |
|---|---|
| TO:[NAME] ○ ○ ○ | DATE: ○○△△, 2009 |
| [COMPANY NAME] △ △ | INVOICE NO. 000/00/1 |
| | XXX CORPORATION |
| MAKE ALL CHECKS PAYABLE | [NAME]: |
| TO XXX CORPORATION. | [ADDRESS]: 11-11-11 YY, ZZ, TOKYO |
| THANK YOU FOR YOUR BUSINESS. | [ZIP CODE]: |
| | [TEL]:       [FAX]: |

| SUBJECT | | ～41 |
|---|---|---|
| TOTAL AMOUNT | 100,000,000 YEN | ～42 |

DEPOSIT TO:    BANK      BRANCH
ORDINARY ACCOUNT/CHECKING ACCOUNT
PAYMENT TERMS

| CODE | ITEM/DESCRIPTION | QUANTITY | UNIT | UNIT PRICE | LINE TOTAL |
|---|---|---|---|---|---|
| A1 | #$%¢ | 3 | CASE | 500,000 | 1,500,000 |
| | | | | | |
| | | | | | |
| | | | | | |
| | | | | | |
| | | | | | |
| | | | | | |
| | | | | SUB TOTAL | |
| | | | | SALES TAX | |
| | | | | TOTAL | |

REMARKS

SEAL | SEAL | Ⓐ   ～43

XXX CORPORATION

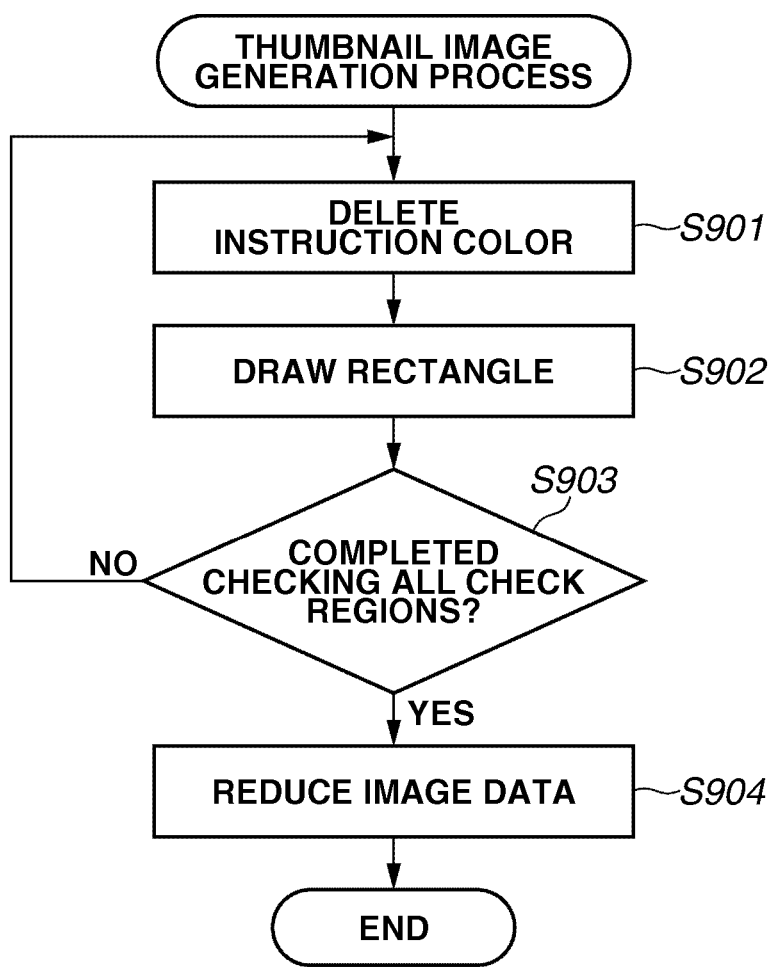

FIG.8

| INVOICE | |
|---|---|
| TO:[NAME]<br>[COMPANY NAME]<br><br>MAKE ALL CHECKS PAYABLE<br>TO XXX CORPORATION.<br>THANK YOU FOR YOUR BUSINESS. | DATE:<br>INVOICE NO.<br><br>XXX CORPORATION<br>[NAME]:<br>[ADDRESS]: 11-11-11 YY, ZZ, TOKYO<br>[ZIP CODE]:<br>[TEL]:       [FAX]: |

— 1000

| SUBJECT | |
|---|---|
| TOTAL AMOUNT | YEN |

— 1001
— 1002

DEPOSIT TO:   BANK          BRANCH
ORDINARY ACCOUNT/CHECKING ACCOUNT
PAYMENT TERMS

| CODE | ITEM/DESCRIPTION | QUANTITY | UNIT | UNIT PRICE | LINE TOTAL |
|---|---|---|---|---|---|
| | | | | | |
| | | | | | |
| | | | | | |
| | | | | | |
| | | | | | |
| | | | | | |
| | | | | | |
| | | | | SUB TOTAL | |
| | | | | SALES TAX | |
| | | | | TOTAL | |

| REMARKS | |

| SEAL | SEAL | SEAL |

— 1003

| XXX CORPORATION |

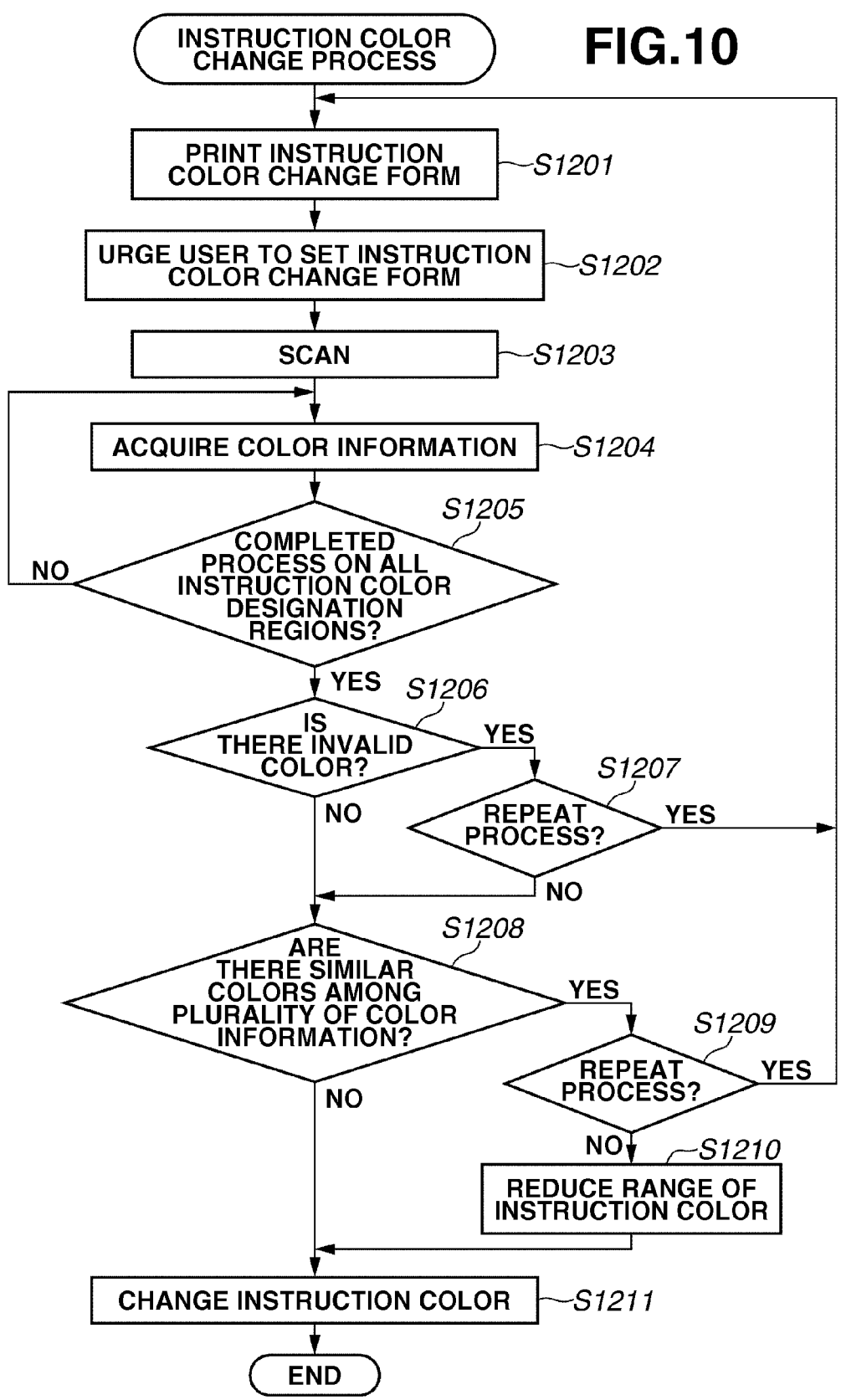

IMAGE PROCESSING APPARATUS, IMAGE PROCESSING METHOD, AND PROGRAM

BACKGROUND OF THE INVENTION

1. Field of the Invention

The present invention relates to an image processing apparatus for recognizing a processing instruction written on a medium, an image processing method, and a program.

2. Description of the Related Art

Conventionally, there is a technique in which a computer analyzes an image on a sheet of paper read by a scanner and recognizes text written on the paper. For example, such a technique can be used to easily extract money amounts and dates written in a plurality of forms and to enter the extracted data to processing such as adding the data. However, instructing the computer on where the various types of data are written in the sheets to automatically perform such processing is to be performed.

Japanese Patent Application Laid-Open No. 2008-145611 discusses a technique in which an answer sheet to be processed and a processing instruction sheet are read by a series of reading processes. The processing instruction sheet describes processing instruction information for instructing which columns are to be processed and the processing to be performed on the contents written in the columns in the answer sheet form. The processing instruction information is then detected and analyzed based on the read data of the processing instruction sheet. As a result, write-in regions which are to be processed on the form and processing contents for each region can be recognized.

According to the above-described method, the regions to be processed and the processing contents corresponding to the regions are read and recognized by the apparatus by a user filling in the processing instruction sheet according to the rules. However, the rules in a case where the user fills in the processing instruction sheet by hand cannot be changed as appropriate.

SUMMARY OF THE INVENTION

According to an aspect of the present invention, an apparatus includes a reading unit configured to read image data, a recognition unit configured to recognize a color of a handwritten portion designating a region in the image data and to recognize processing associated with the color of the handwritten portion, a display unit configured to display the recognized color and a content of the processing associated with the color, and a changing unit configured to change an association between the recognized color and the content of the recognized processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, and 2C illustrate examples of documents to be processed according to an exemplary embodiment of the present invention.

FIG. 7 is a flowchart illustrating a thumbnail image generation process.

FIG. 8 illustrates an example of a thumbnail image.

FIG. 10 is a flowchart illustrating an instruction color change process.

DESCRIPTION OF THE EMBODIMENTS

Various exemplary embodiments, features, and aspects of the invention will be described in detail below with reference to the drawings.

Figure 1:
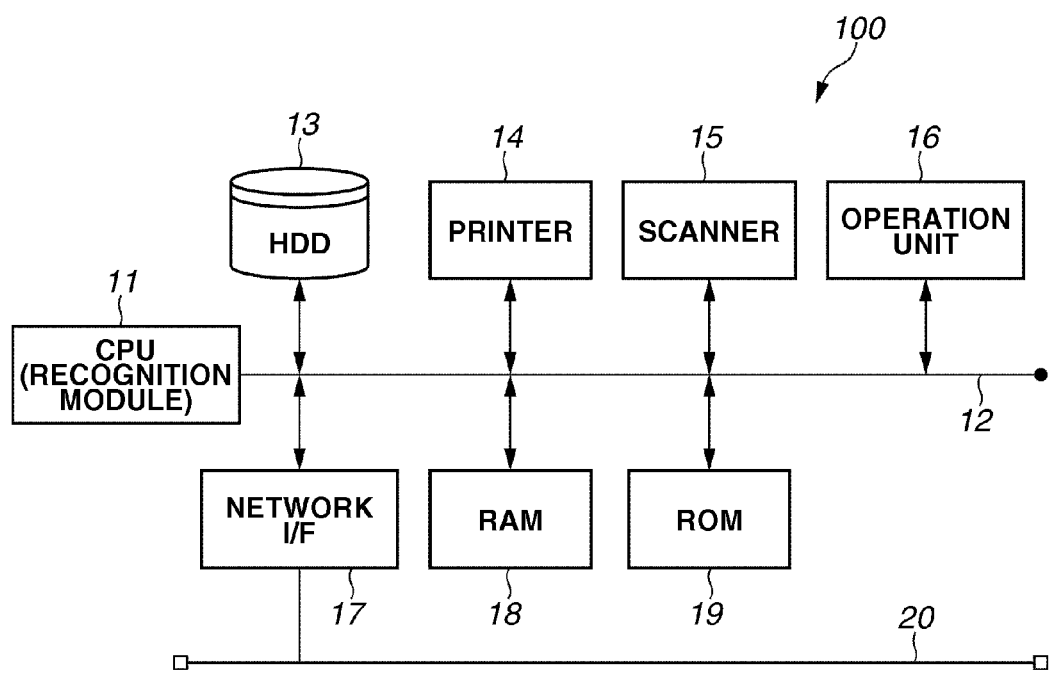
FIG. 1 is a block diagram illustrating a configuration of an image processing apparatus according to an exemplary embodiment of the present invention.

FIG. 1 is a block diagram illustrating a configuration of an image processing apparatus according to a first exemplary embodiment of the present invention. Referring to FIG. 1, an image processing apparatus 100 is a multifunction peripheral including various functions such as a copy function and a scanner function. The functions can also be realized by a plurality of apparatuses in cooperation with each other.

A central processing unit (CPU) 11 controls the entire operations of the image processing apparatus 100 by loading programs stored in a read-only memory (ROM) 19 onto a random access memory (RAM) 18. Further, the CPU 11 communicates with each of the components in the image processing apparatus 100 via a bus 12. An operation unit 16 includes a plurality of keys used by the user to give instructions, and a display unit for displaying various types of information to be informed to the user. A scanner 15 reads as a color image an image on a document that the user sets on a document positioning plate and stores the acquired electronic data (image data) in a hard disk drive (HDD) 13 or the RAM 18. The HDD 13 includes a hard disk and stores various input information. The scanner 15 also includes a document feeding device, so that a plurality of documents set on the document feeding device can be sequentially fed to the document positioning plate and be read by the scanner 15. A printer 14 prints on a recording sheet an image based on the input image data. A network interface (I/F) 17 connects the image forming apparatus 100 to a network 20 and controls receiving and transmitting data to and from an external device on the network.

According to the present exemplary embodiment, the image data to be used in performing processing to be described below is input via the scanner 15. However, image data of a document transmitted from an external device can be input via the network I/F 17 and be similarly processed. Further, a personal computer (PC) connected to a scanner and a printer can similarly perform processing. In such a case, the entire program or a portion of the program used in the present exemplary embodiment can be supplied to the PC via the network or by storing in a recording medium such as a compact disc (CD)-ROM.

An example of a document to be used in the present exemplary embodiment will be described below. FIG. 2A illustrates an example of a form of the document to be used in the present exemplary embodiment. Referring to FIG. 2A, the document is an invoice which has not been filled in (i.e., before being added processing instruction information to be described below) by the user. The invoice includes the following information: Name of company to be billed, person in charge of the company to be billed, subject, total amount, item, quantity, unit, unit price, amount of payment, bank deposit information, sub-total, and tax including consumption tax. The invoice further includes a remarks column and a space where an issuer places a seal. When officially issuing the invoice, the user writes the information in the columns to indicate the subject, items and quantity, units, unit prices, and amounts of payment, and places the seal.

According to the present exemplary embodiment, a process is performed to check whether the information is added to the columns designated by the user and other columns are left blank in the invoice.

FIG. 2B illustrates an example in which the user has arbitrarily marked the regions to be checked among the items included in the document illustrated in FIG. 2A. The user marks the regions using color pens. The document illustrated in FIG. 2B thus becomes the processing instruction sheet.

The processing instruction sheet is created by the user who is to check the created invoice. The user writes the processing instruction information to be described below in a sheet of a similar format as the invoice to be checked. In other words, the processing instruction sheet is created by the user writing the processing instruction information in the invoice illustrated in FIG. 2A. According to the present exemplary embodiment, the user uses a color pen to designate the region to be processed by encircling the region with a rectangle. The region can be designated by drawing a line at the bottom of the region, alternatively.

The processing instruction information (i.e., additional information) to be written in the invoice (i.e., document) will be described below. Referring to FIG. 2B, the user may mark a region 31 using a blue color pen, a region 32 using a green color pen, and a region 33 using a red color pen. Colors other than the above can also be used, and the number of colors is not limited to three and can be increased or decreased according to the contents to be checked. Further, means other than the color pens can be used as long as color marks can be written on the document.

The user previously registers in the RAM 18 via the operation unit 16 information about the colors of the processing instruction information to be used and the processing contents associated with each other. More specifically, the user registers in the RAM 18 that the blue pen is used to check whether the column is blank, the green pen to check whether information is entered, and the red pen to check whether there is a seal or a signature. The CPU 11 then determines a color component (e.g., a hue) of each color registered in the RAM 18 and stores the determined content therein. The color registration can also be performed by the scanner 15 reading the added information written in the form. Further, the image processing apparatus 100 can previously register the colors instead of the user. In a case where the process is to be performed according to the previously registered contents, the user adds the processing instruction information to the document according to the registered colors and processing contents.

As described above, the processing instruction sheet is created according to the registered color components of the processing instruction information to be used and the corresponding processing contents. The processing instruction information is thus extracted using the processing instruction sheet, and the processing contents are recognized according to the extracted results. The image processing apparatus 100 then checks whether a specific region contains information, is blank, or is sealed.

FIG. 2C illustrates an example of a document to be checked according to the present exemplary embodiment. Referring to FIG. 2C, the document to be checked is of a similar format as the documents illustrated in FIGS. 2A and 2B. According to the present exemplary embodiment, the added processing instruction information as illustrated in FIG. 2B is extracted. The extracted result is then used to determine that the document is normal if a region 41 does not include any content, i.e., the region 41 is blank, a region 42 includes content, and a region 43 is sealed. Since FIG. 2C illustrates an example in which all conditions for determining that the document is normal are satisfied, the check result of the document becomes normal. On the other hand, if even one region does not satisfy the condition for determining that the document is normal, the check result of the document becomes not normal. The contents and the regions to be checked are not limited to the above-described contents and regions, and instructions can be issued to check other contents and regions.

A process for creating a scan ticket to check the contents described in the document according to the processing instruction sheet illustrated in FIG. 2B will be described below. The image processing apparatus 100 recognizes the contents of the instructions illustrated in FIG. 2B and converts a method for checking the document to be checked such as illustrated in FIG. 2C (e.g., a QR code) into a form that can be recognized, i.e., the scan ticket. The scan ticket includes the contents of the instructions recognized from the document illustrated in FIG. 2B, and position information of the regions to which such contents of the instructions are to be applied. When the document is to be checked, the scanner 15 reads the scan ticket and the CPU 11 is then caused to recognize the processing contents.

Figure 3:
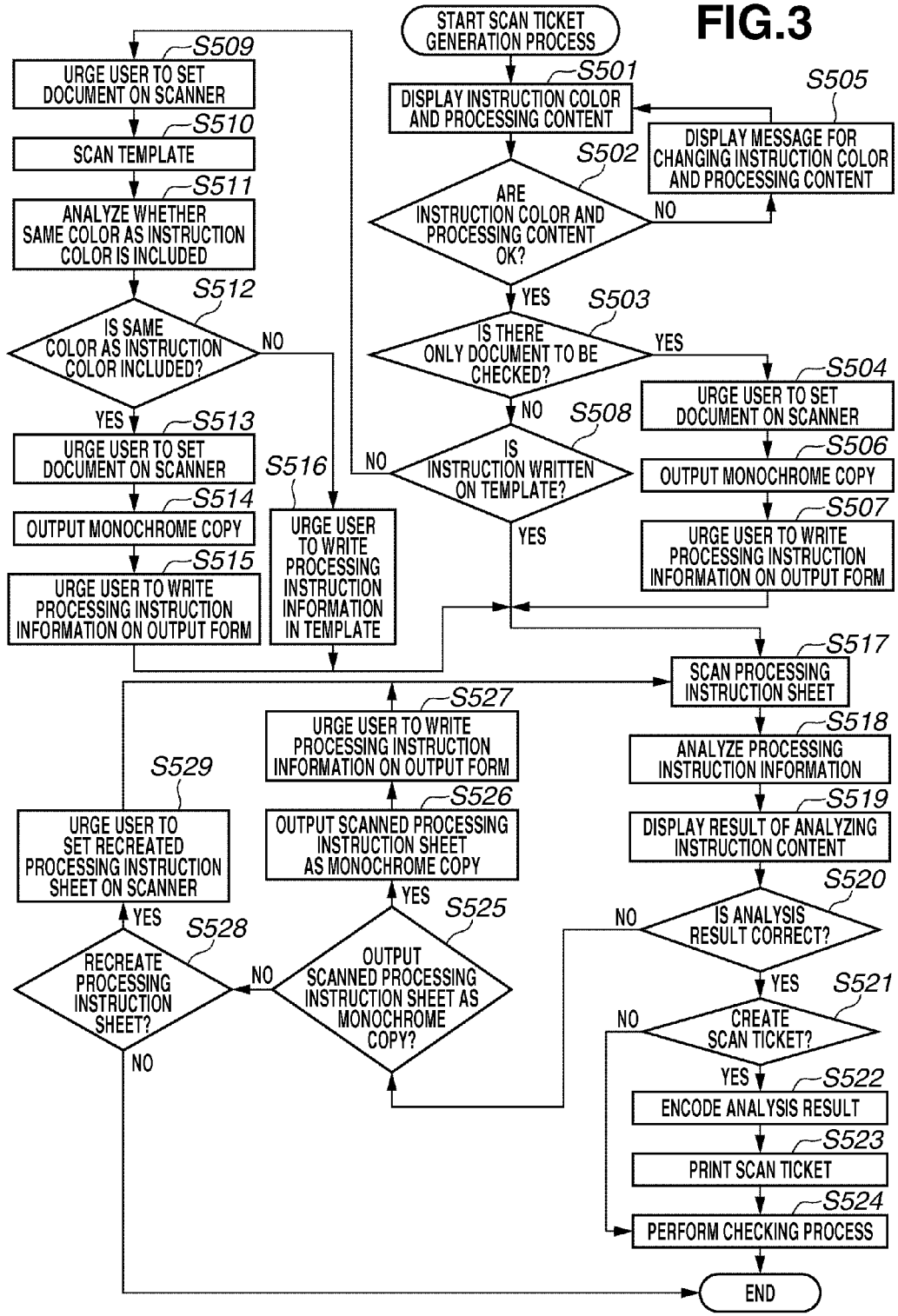
FIG. 3 is a flowchart illustrating a process for generating a scan ticket according to an exemplary embodiment of the present invention.
Figure 5:
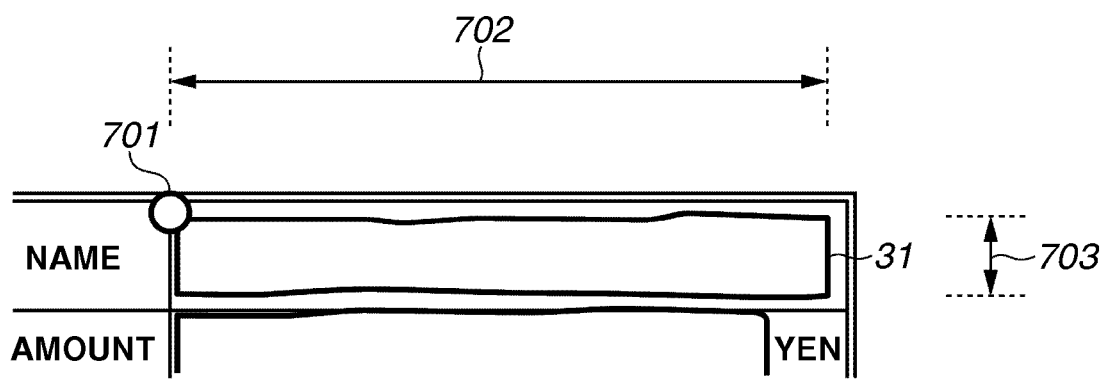
FIG. 5 illustrates an enlarged portion of the processing instruction sheet.
Figure 6:
FIG. 6 illustrates an example of a Quick Response (QR) code.

The scan ticket creation process according to the present exemplary embodiment will be described in detail below. FIG. 3 is a flowchart illustrating the scan ticket creation process according to the present exemplary embodiment. Further, FIG. 5 illustrates an enlarged version of the processing instruction region 31, and FIG. 6 illustrates an example of the QR code in which the processing instruction information is encoded.

The flowchart of FIG. 3 illustrates the flow of a process performed by the CPU 11 loading onto the RAM 18 and executing a program stored in the ROM 19.

When the user instructs the image processing apparatus 100 via the operation unit 16 to create the scan ticket, the process is started. In step S501, the CPU 11 causes the operation unit 16 to display a combination of an instruction color of the processing instruction information (herein after referred to as instruction color) and the processing content. For example, the operation unit 16 displays "OK if there is a seal or signature in a region enclosed by red color", "OK if a region enclosed by blue color is blank", or "OK if there is a writing in a region enclosed by green color". In step S502, the CPU 11 further causes the operation unit 16 to display an inquiry to the user on whether the combination of the instruction color and the processing content displayed in step S501 is correct.

If the user disagrees to the inquiry of step S502 via the operation unit 16 (NO in step S502), the process proceeds to step S505. In step S505, the CPU 11 causes the operation unit 16 to display a message that the combination of the instruction color and the processing content will be changed. More specifically, the operation unit 16 may display an inquiry on which color to be changed to and display a new color instead of the instruction color, or the user may designate an arbitrary color via the operation unit 16. Further, the user may only be required to change the combination of the color and the processing content instead of adding a new color. In such a case, since different processing contents cannot be instructed with the same color, the CPU 11 performs control so that a processing content is paired with one color. Upon changing the instruction color or the processing content or both the instruction color and the processing content in step S505, the CPU 11 causes the operation unit 16 to display a combination of the instruction color and the processing content as in step S501. As a result, the user can confirm that the change process has been performed in step S505. If the user then agrees to the inquiry of step S502 via the operation unit 16 (YES in step S502), the CPU 11 determines and registers in the RAM 18 the instruction color of the processing instruction information to be used and the corresponding processing content.

In the determination process of step S502, the user is caused to visually confirm the content of the document (i.e., colors included in the document). If the user then determines that the color component of the instruction color and a color component included in the document are similar, the color components are distinguished to become different from each other. An error in extracting the processing instruction information can thus be prevented.

Further, if it is determined in step S502 that the color component of the instruction color and the color component included in the document are similar, the operation unit 16 is caused to display a message urging the user to set the document as will be described below. If it is then determined that the user has set the document, the document can be copied in monochrome. As a result, an error in extracting the processing instruction information when the processing instruction information is added using a chromatic color pen can be prevented.

When the user determines that the instruction color and the processing content are OK in step S502, the CPU 11 identifies the color component to be used as the processing instruction information and stores the color component in the RAM 18. In step S503, the CPU 11 causes the operation unit 16 to display an inquiry on whether the user only has the document to be checked at hand (i.e., illustrated in FIG. 2C). This is to confirm whether there is a document to be a template for creating the processing instruction sheet (i.e., illustrated in FIG. 2A or FIG. 2B). In other words, if the user only has the document to be checked, a document for writing in the processing instruction information can be created from the document to be checked as will be described below. Such a template is not officially the document to be checked and is instead a document in which the user can add in the processing instruction information. If the CPU 11 receives a response via the operation unit 16 that the user only has the document to be checked (i.e., there is no document to be the template) (YES in step S503), the process proceeds to step S504. In step S504, the CPU 11 causes the operation unit 16 to display a message urging the user to set the document to be checked on the scanner 15. For example, the operation unit 16 displays a message "set one sheet of the document to be checked on the scanner and press the OK button" and an OK button. The CPU 11 recognizes that the document is set when the user presses the OK button. The CPU 11 can also automatically recognize that the document is set on the scanner 15 by using the photo-interpreter below the document positioning plate or the document sensor of the document feeding device.

Upon determining that the user has pressed the OK button in step S504, the process proceeds to step S506. In step S506, the CPU 11 causes the scanner 15 to read the image in the document to be checked. The CPU 11 further converts the image data input from the scanner 15 to monochrome image data, outputs the monochrome image data to the printer 14, and causes the printer 14 to output a monochrome copy on the recoding sheet. In step S506, the document is converted to monochrome and printed by the printer 14. However, the present invention is not limited to the above, and a color of the image in the read document can be converted to colors other than the instruction color and be printed by the printer 14. For example, the document is output by converting red characters in the read document to blue characters. Furthermore, colors to be converted can be previously registered in the RAM 18, and if a registered color exists in the read document, the color can be converted.

In step S507, the CPU 11 causes the operation unit 16 to display a message urging the user to write the processing instruction information illustrated in FIG. 2B in the recording sheet output by the printer 14 in step S506. On the other hand, if the CPU 11 receives a response that the user has the template document (NO in step S503), the process proceeds to step S508. In step S508, the CPU 11 causes the operation unit 16 to display an inquiry on whether the processing instruction information (as illustrated in FIG. 2B) is already written in the template. If the user responds via the operation unit 16 that the instruction information is not written in the template (NO in step S508), the process proceeds to step S509. In step S509, the CPU 11 causes the operation unit 16 to display a message urging the user to set the template on the scanner 15. For example, the operation unit 16 displays a message, i.e., "set the template on the scanner and press the OK button", and the OK button. According to the present exemplary embodiment, the CPU 11 recognizes that the document is set by the user pressing the OK button. However, the CPU 11 can automatically recognize that the document is set on the scanner 15 by using the photo-interpreter located below the document positioning plate or the document sensor of the document feeding device.

Upon the user pressing the OK button in step S509, the process proceeds to step S510. In step S510, the CPU 11 causes the scanner 15 to read the image in the template document. In step S511, the CPU 11 analyzes the acquired image data and performs a recognition process for determining whether the image data includes a color having the same color component as the instruction color. For example, if the CPU 11 is to analyze and recognize whether the red color is included in the acquired image data, the CPU 11 extracts a red hue component. Various known methods for analyzing and recognizing the hue component can be employed. Further, parameters other than the hue can be used, or a combination of other parameters can be used.

In step S512, the CPU 11 determines whether there is a color among the colors analyzed and recognized in step S511 which is the same as the instruction color registered in the RAM 18. It is not necessary for the colors to exactly match in the determination process, and the colors can be determined to match if they are within an allowable range. For example, in a case where the red, green, and blue (RGB) values are expressed in 256 gradations, the colors are determined to be the same as a result of comparison if the R, G, and B values of the recognized color and the instruction color are within plus or minus 20 gradations. The recognized color can be determined to be the same as the instruction color using a method other than the above-described method.

If the CPU 11 determines that the image of the template includes the same color as the instruction color registered in the RAM 18 (YES in step S512), the process proceeds to step S513. In step S513, the CPU 11 causes the operation unit 16 to display a message urging the user to set the template on the scanner 15. For example, the operation unit 16 displays a guiding message, i.e., "set the template on the scanner and press the OK button", and the OK button. According to the present exemplary embodiment, the CPU 11 recognizes that the document is set by the user pressing the OK button. However, the CPU 11 can automatically recognize that the document is set on the scanner 15 by using the photo-interpreter located below the document positioning plate or the document sensor of the document feeding device.

Upon the user pressing the OK button in step S513, the process proceeds to step S514. In step S514, the CPU 11 causes the scanner 15 to read the image in the document to be checked. The CPU 11 then converts the image data input from the scanner 15 to monochrome image data, outputs the converted image data to the printer 14, and causes the printer 14 to output a monochrome copy on the recording sheet. The present invention is not limited to converting the document into a monochrome image and print on the printer 14. Other methods as described above (i.e., as in step S506) can be employed.

In step S515, the CPU 11 causes the operation unit 16 to display a message urging the user to write the processing instruction information as illustrated in FIG. 2B on the recording sheet output by the printer in step S514.

On the other hand, if the CPU 11 determines that the template image does not include the same color as the instruction color registered in the RAM 18 (NO in step S512), the process proceeds to step S516. In step S516, the CPU 11 causes the operation unit 16 to display a message urging the user to write on the template document the processing instruction information as illustrated in FIG. 2B.

In step S508, the CPU 11 causes the operation unit 16 to display a message for confirming whether the processing instruction information is already written in the template. If the CPU 11 receives via the operation unit 16 a response that the instruction information is written in the template (YES in step S508), the process proceeds to step S517. In step S517, the CPU 11 causes the scanner 15 to read the image in the template document in which the instructions are already written. The scanner reads the document similarly as in the process for outputting a monochrome copy described above. More specifically, the CPU 11 causes the operation unit 16 to display a message urging the user to set the document in which the instruction information is written. Upon the user setting the document and pressing the OK button, the scanner 15 reads the document. However, the image data read and acquired by the scanner 15 is not converted to the monochrome image data and is stored in the RAM 18.

In step S518, the CPU 11 analyzes and recognizes the processing instruction information in the image data input from the scanner 15. The CPU 11 analyzes where the instruction color determined in step S502 is included in the document and identifies the position of the region to be processed for each color by recognizing the color of the analyzed portion. The position and the size of the region to be processed in the document can thus be determined by the identified position. For example, the position is identified using coordinates.

FIG. 5 illustrates a region corresponding to the processing instruction region 31 illustrated in FIG. 2B which the user has written in using a blue color pen and is recognized in step S518 as the encircled region. Referring to FIG. 5, a starting point 701 in the upper left end, a width 702, and a height 703 are extracted as check region information. When a position in an X-Y coordinate system is expressed as (Y, X), the starting point 701 is (1108, 963), the width 702 is 834, and the height 703 is 128.

Similarly, in the case of the processing instruction region 32 written in by the checker with a green color pen, the values of the starting point, the width, and the height are (1240, 963), 740, and 100, respectively. Further, in the case of the processing instruction region 33 written in by the checker with a red color pen, the values of the starting point, the width, and the height are (2955, 2050), 200, and 171, respectively. Furthermore, the instruction colors are determined from the processing instruction regions 31, 32, and 33, and processing codes are extracted. Since the processing instruction region 31 is written in using the blue color pen, the processing code is 1. Similarly, the processing code is 0 for the processing instruction region 32 written in with the green color pen, and the processing code is 2 for the processing instruction region 33 written in with the red color pen.

The CPU 11 then stores in the RAM 18 the identified positions associated with the processing contents determined in step S502.

In step S519, the CPU 11 causes the operation unit 16 to display the result of the analysis and the recognition performed in step S518. For example, the operation unit 16 displays the coordinates and the processing contents of the regions corresponding to the identified processing instruction information. Further, the operation unit 16 may display a thumbnail image of the read document, so that the user can recognize the position of the processing instruction information with respect to the image and the processing content. In step S520, the CPU 11 causes the operation unit 16 to display a confirmation to the user on whether the result of the analysis and the recognition displayed in step S519 is correct. If the CPU 11 receives a response from the user via the operation unit 16 that the result is incorrect (NO in step S520), the process proceeds to step S525. In step S525, the CPU 11 causes the operation unit 16 to display a confirmation to the user on whether the template image read by the scanner 15 in step S517 is to be output in monochrome.

If the CPU 11 receives a response from the user via the operation unit 16 to output the template image in monochrome (YES in step S525), the process proceeds to step S526. In step S526, the CPU 11 converts the image of the document read by the scanner 15 in step S517 to monochrome image data and causes the printer 14 to output the monochrome copy.

More specifically, if the processing instruction information cannot be correctly extracted, the processing instruction sheet in which the processing instruction information is added is copied in monochrome. The output is used so that the user can again add the processing instruction information. In step S526, the document is thus converted to monochrome and printed by the printer 14. However, the present invention is not limited to such a method, and various methods as described above (i.e., as in step S506) can be employed instead.

In step S527, the CPU 11 causes the operation unit 16 to display a message urging the user to write the processing instruction information in the recording sheet output by the printer 14 in step S526.

Returning to step S525, if the CPU 11 receives a response from the user via the operation unit 16 not to output the template image in monochrome (NO in step S525), the process proceeds to step S528. In step S528, the CPU 11 causes the operation unit 16 to display a message confirming whether to create a new processing instruction sheet. If the user instructs via the operation unit 16 to create a new processing instruction sheet (YES in step S528), the process proceeds to step S529. In step S529, the CPU 11 causes the operation unit 16 to display a message urging the user to set a newly created processing instruction sheet on the scanner 15. On the other hand, if the user instructs via the operation unit 16 not to create a new processing instruction sheet (NO in step S528), the process ends.

If the user instructs the apparatus to read the document by setting the newly created document and pressing the OK button after the messages are displayed in step S527 and step S529, the CPU 11 repeats the process of step S517 described above.

Returning to step S520, if the CPU 11 receives via the operation unit 16 a response from the user that the result of the analysis is correct (YES in step S520), the CPU 11 stores in the RAM 18 the analyzed content as the extraction result of the processing instruction information. In step S521, the CPU 11 causes the operation unit 16 to display an inquiry on whether to create the scan ticket. If the CPU 11 receives via the operation unit 16 a response to create the scan ticket (YES in step S521), the process proceeds to step S522. In step S522, the CPU 11 encodes the analyzed content using, for example, a two-dimensional code (e.g., the QR code) to encode the analysis result displayed in step S519. The region which is instructed to be processed and the corresponding processing content are encoded.

For example, in the case of the processing instruction sheet illustrated in FIG. 2C, the processing instruction information of the processing instruction regions 31, 32, and 33 are written as a character string. Such a character string includes the X-coordinate of the starting point, the Y-coordinate of the starting point, the width, the height, and the processing codes in such an order separated by commas and becomes as follows: "963, 1108, 834, 128, 1, 963, 1240, 740, 100, 0, 2050, 2955, 200, 171, 2". FIG. 6 illustrates the above-described character string encoded into the QR code.

According to the present exemplary embodiment, a two-dimensional code is described as an example. However, the character string can be encoded using other methods as long as the image processing apparatus 100 can analyze and recognize such a code. In step S523, the CPU 11 causes the printer 14 to output on the recording sheet and to print the encoded character string created in step S522 as an image.

The CPU 11 can then use the printed scan ticket and check the document to be checked. However, if the user determines that the result of the analysis is correct in step S520, it indicates that the processing instruction sheet which the CPU 11 caused the scanner 15 to read in step S517 has been correctly recognized. It thus becomes unnecessary to perform the processes of step S521, step S522, and step S523, and the read processing instruction sheet may be used as the scan ticket. In such a case, the processing content is recognized from the processing instruction sheet when performing the checking process.

Returning to step S521, if the CPU 11 receives via the operation unit 16 a response not to create the scan ticket (NO in step S521), the CPU 11 causes the operation unit 16 to display an identification (ID) for identifying the analyzed content registered in step S520. Such a process is performed to identify and read from the RAM 18 the analyzed content to be used in checking the check document. The user may designate an ID from the operation unit 16 instead of the CPU 11 proposing the ID. The CPU 11 then stores in the RAM 18 the determined ID associated with the analyzed content, and the process proceeds to step S524.

In step S524, the CPU 11 checks the document to be checked according to the processing instruction information and the corresponding processing content recognized as described above.

According to the above-described process, the color component included in the document is converted to become different from the color component of the instruction color. The document for the user to add the processing instruction information can then be printed. As a result, the processing instruction information added to the processing instruction sheet can be correctly recognized. In other words, errors in recognizing the processing instruction information can be reduced. Further, since the operations for performing the above-described process can be appropriately displayed to the user (e.g., a message urging the monochrome copy to be output), errors generated by user operations can be reduced. It is not necessary to perform all of the above-described processes illustrated in the flowchart, and a portion of the processes may be performed.

A procedure for checking the document according to the extracted processing instruction information using the scan ticket created as described above (i.e., the process performed in step S524) will be described below with reference to FIG. 4.

Figure 4:
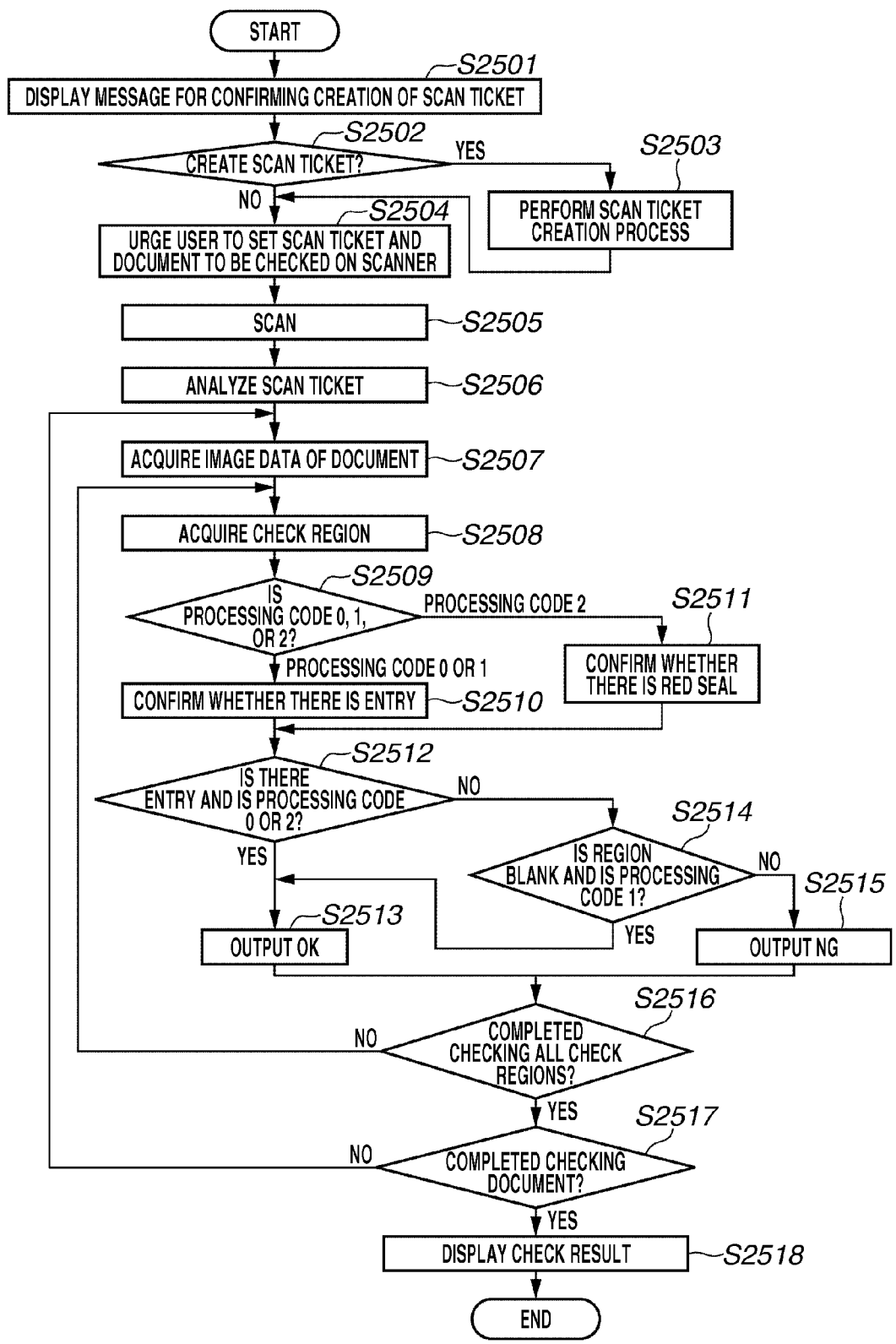
FIG. 4 is a flowchart illustrating a process for checking a document using a scan ticket according to an exemplary embodiment of the present invention.

FIG. 4 is a flowchart illustrating a checking process performed by the image processing apparatus according to the present exemplary embodiment.

In step S2501, the CPU 11 causes the operation unit 16 to display a confirmation on creating the scan ticket as will be described below.

In step S2502, the CPU 11 causes the operation unit 16 to display an inquiry on whether to create the scan ticket. If the CPU 11 receives via the operation unit 16 a response to create the scan ticket (YES in step S2502), the process proceeds to step S2503. On the other hand, if the CPU 11 receives via the operation unit 16 a response not to create the scan ticket from the checker who has already acquired the scan ticket (NO in step S2502), the process proceeds to step S2504 without performing the scan ticket creation process.

In step S2503, the CPU 11 performs the scan ticket creation process in which the scan ticket is created from the above-described processing instruction sheet. The process then proceeds to step S2504. The details of the scan ticket and the scan ticket creation process are as described above.

In step S2504, the CPU 11 causes the operation unit 16 to display that the document to be checked will be scanned after the scan ticket is first scanned and urges the user to set the documents on the scanner 15.

In step S2505, upon a sensor (not illustrated) detecting that the documents are set, the CPU 11 instructs the scanner 15 to read the scan ticket and the document to be scanned, and the HDD 13 to store the image data. According to the present exemplary embodiment, there is only one document to be checked as illustrated in FIG. 2C for ease of description. However, a plurality of documents can also be checked.

In step S2506, the CPU 11 reads the image data of the scan ticket stored in the HDD 13 and analyzes the scan ticket. A plurality of processing instruction information is encoded in the QR code and printed in the scan ticket. Each of the processing instruction information includes the check region information indicating which region is to be checked, and the processing code indicating the processing method for checking the check region. The CPU 11 detects the position of the QR code included in the image data of the scan ticket, decodes the QR code, and acquires the plurality of processing instruction information. According to the present exemplary embodiment, the check region information of the processing instruction information indicates the coordinates on the image data and includes the X-Y coordinates of a starting point of the processing region, and the width and height from the starting point. Further, the processing code which indicates the processing method for checking the check region is a number corresponding to the processing method for the check region.

According to the present exemplary embodiment, three types of processing methods correspond to the processing codes respectively, i.e., whether there is an entry in the check region (processing code: 0), whether the check region is blank (processing code: 1), and whether there is a red seal (processing code: 2). If the CPU 11 reads a plurality of documents to be checked in step S2505, the processing instruction information written in the scan ticket which is set as the first document is applied to all subsequent documents to be checked. The processing instruction information is valid until the checking process is completed.

In step S2507, the CPU 11 sequentially reads the image data to be checked stored in the HDD 13.

In step S2508, the CPU 11 selects one processing instruction information from the plurality of processing instruction information. The CPU 11 then sequentially acquires from the image data read in step S2507 the check region based on the starting point, the width, and the height indicated by the check region information of the processing instruction information.

In step S2509, the CPU 11 confirms the processing code for the check region from the processing instruction information used in step S2508. If the processing code is 0 or 1, the process proceeds to step S2510. If the processing code is 2, the process proceeds to step S2511.

In step S2510, the CPU 11 checks whether there is an entry in the check region. According to the present exemplary embodiment, the image data within the check region acquired in step S2508 is converted into a hue, lightness, and saturation (HLS) color space. Whether there is an entry in the check region can thus be determined based on a percentage of pixels in the check region whose luminance L is lower than a predetermined brightness. According to the present exemplary embodiment, the image data of the check region acquired from the image data is described in an RGB color space. Therefore, the percentage of the pixels in the check region whose luminance L is less than 50% is acquired, and if the percentage of the pixels is 10% or greater, it is determined that there is an entry in the check region. The determination method is not limited to the above as long as an entry can be determined. For example, an entry can be determined by a length of the dark pixels continuing in the main scanning direction. Further, since the conversion from the RGB color space to the HLS color space is a known technique, detailed description is omitted.

In step S2511, the CPU 11 checks whether there is a red seal in the acquired check region. According to the present exemplary embodiment, the check region is converted into the HLS color space using a similar method as in step S2510. The CPU 11 then determines whether there is a red seal based on the percentage of pixels in the processing region whose saturation S and hue H are within a predetermined range. More specifically, according to the present exemplary embodiment, the percentage of the pixels in the check region whose saturation S is 20% or greater and hue H is 30 degrees or lessor 330 degrees or greater is acquired. If the percentage of such pixels is greater than or equal to 10%, the CPU 11 determines that there is a red seal. The determination method is not limited to the above-described method as long as it can be determined whether there is the red seal. For example, the red seal can be determined by the length of pixels continuing in the main scanning direction whose saturation S and hue H are within a predetermined range.

In step S2512, the CPU 11 determines whether the percentage acquired in step S2510 or step S2511 is greater than or equal to a predetermined value, and the processing code of the check region is 0 or 2. If the percentage and the processing code match the above-described conditions (YES in step S2512), the process proceeds to step S2513. On the other hand, if the percentage and the processing code do not match the above-described conditions (NO in step S2512), the process proceeds to step S2514.

In step S2514, the CPU 11 determines whether the percentage acquired in step S2510 or step S2511 is less than a predetermined value, and the processing code of the check region is 1. If the percentage and the processing code match the above-described conditions (YES in step S2514), the process proceeds to step S2513. If the percentage and the processing code do not match the above-described conditions (NO in step S2514), the process proceeds to step S2515.

In step S2513, the CPU 11 stores in the RAM 18, i.e., the work memory, that the result of checking the check region acquired in step S2508 is OK.

In step S2515, the CPU 11 stores in the RAM 18 that the result of checking the check region acquired in step S2508 is not OK (NG).

In step S2516, the CPU 11 determines whether all of the plurality of processing instruction information are checked for the image data read in step S2507. If all of the plurality of processing instruction information are checked (YES in step S2516), the process proceeds to step S2517. If the checking process is not completed (NO in step S2516), the process returns to step S2508.

In step S2517, the CPU 11 determines whether processing of all of the image data of the document to be checked read in step S2505 has been completed. If the processing has been completed (YES in step S2517), the process proceeds to step S2518. If the processing has not been completed (NO in step S2517), the process returns to step S2507.

In step S2518, upon completing the process on all check regions for the image data of all documents to be checked, the CPU 11 transmits the check results and an instruction to display the check results to the operation unit 16. The checking process then ends. The check result to be displayed on the operation unit 16 is the document to be checked read in step S2505, and if even one result of checking the check region is "NO", the operation unit 16 notifies that the result of the checking result according to the present exemplary embodiment is "NO". The display content of the check result and the method for displaying the check result are not limited to the above-described content and method, and more detailed information can be displayed. Further, the image data can be generated from the check result and transmitted to the printer 14 so that a report is output.

The thumbnail image generation process will be described in detail below.

FIG. 7 is a flowchart illustrating the thumbnail image generation process according to the present exemplary embodiment in step S519 illustrated in FIG. 3. FIG. 8 illustrates an example of the thumbnail image.

The process illustrated in the flowchart can be realized by the CPU 11 loading the program stored in the ROM 19 onto the RAM 18 and executing thereon. In step S901, the CPU 11 sequentially deletes from the image data of the processing instruction sheet the rectangles written in by the checker using the color pens to instruct processing. More specifically, the CPU 11 uses the processing instruction information acquired in step S518 to identify the region in the image data corresponding to the rectangle written in to instruct processing. The CPU 11 then replaces the pixels of the instruction color included in the region with a background color of the processing instruction sheet and thus deletes the rectangles for instructing processing from the image data.

In step S902, the CPU 11 uses the processing instruction information acquired in step S518 to draw a rectangle configured by linear lines in the region of the image data in which the rectangle written in to instruct processing is deleted. The position where the rectangle is to be drawn can be determined from the information about the starting point, the width, and the height included in the check region information of the processing instruction information. According to the present exemplary embodiment, colors in a defined range are set to the instruction colors, so that a color whose luminance L is 50%, saturation S is 100%, and hue H is at the center of the range of the instruction color is used to draw the rectangle. For example, in the processing instruction sheet illustrated in FIG. 2B, the rectangle in the processing instruction region 31 written in by the checker is deleted. A rectangle 1001 as illustrated in FIG. 8 is then drawn using a blue color pen as the instruction color according to the processing instruction information. Similarly, the rectangles written in by the checker as the processing instruction regions 32 and 33 are deleted, and a rectangle 1002 is drawn using the green color pen and a rectangle 1003 is drawn using the red color pen as instruction colors according to the processing instruction information.

In step S903, the CPU 11 determines whether the above-described process has been performed for all processing instruction information acquired in step S518 of the flowchart illustrated in FIG. 3. If the process is completed (YES in step S903), the process proceeds to step S904, and if the process is not completed (NO in step S903), the process returns to step S901.

In step S904, the CPU 11 reduces the image data acquired by performing the processes from step S901 to step S903 and generates a thumbnail image 1000. More specifically, the CPU 11 generates the thumbnail image to be displayed on the operation unit 16 by reducing the image data to a size for displaying on the operation unit 16 in step S519 of the flowchart illustrated in FIG. 3. Further, the CPU 11 reduces the image data in which the rectangles of processing instruction acquired by the processes performed from step S901 to step S903 are deleted to a size for generating the scan ticket in step S523. The CPU 11 thus generates the thumbnail image for generating the scan ticket, and the process then ends. According to the present exemplary embodiment, a bi-cubic method is used to reduce the image data. However, the method is not limited to the bi-cubic method, and a nearest neighbor method can also be used.

Figure 9:
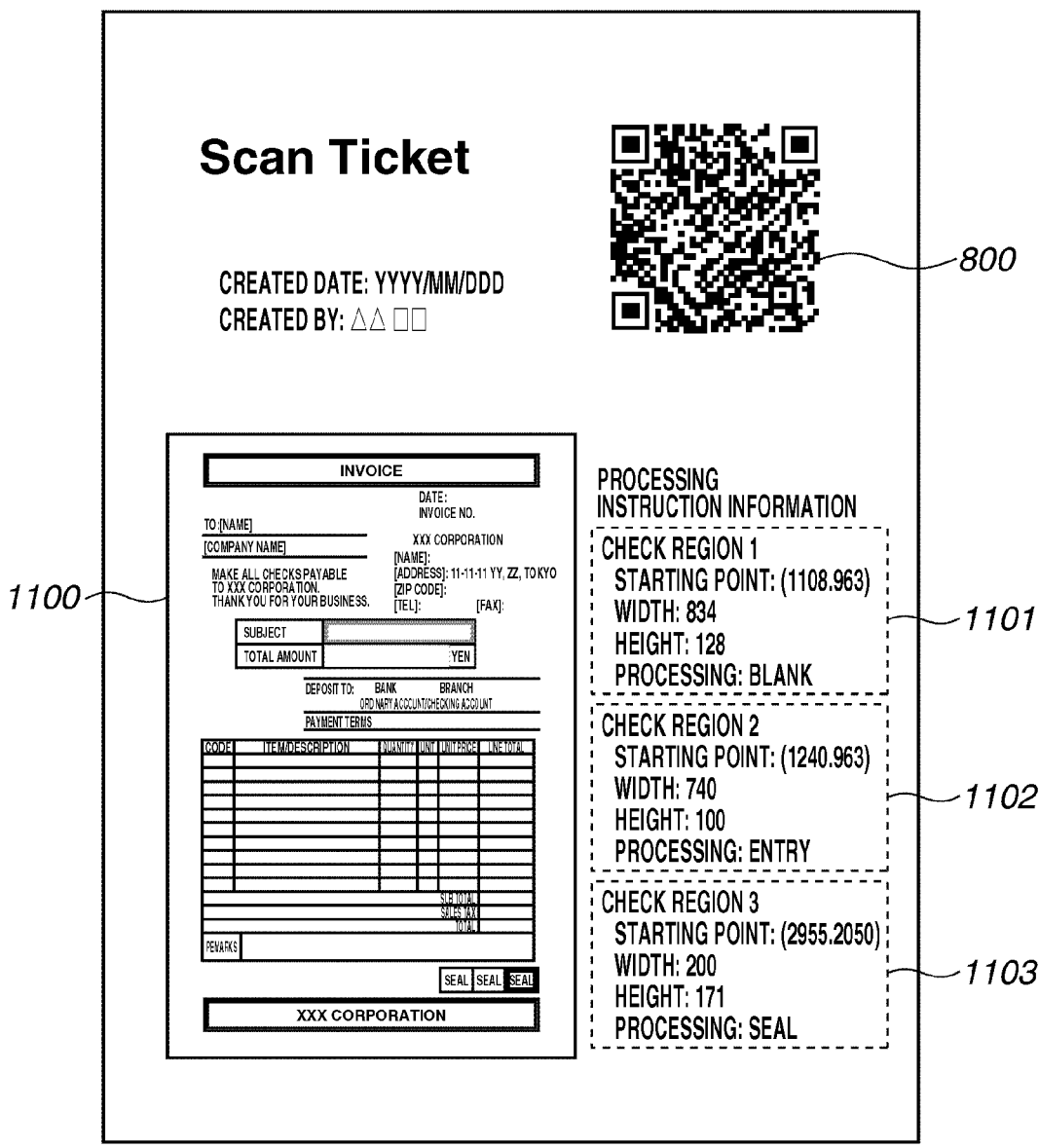
FIG. 9 illustrates an example of a scan ticket.

FIG. 9 illustrates an example of the scan ticket generated from the processing instruction sheet illustrated in FIG. 2B.

The scan ticket includes a QR code 800 illustrated in FIG. 6 in which the processing instruction information is encoded, the thumbnail image 1000, and processing instruction information 1101, 1102, and 1103. The processing instruction information 1101 indicates the check region information (i.e., the coordinates of the starting point, the width, and the height of the check region) acquired from the processing instruction region 31 illustrated in FIG. 2B. The processing instruction information 1102 indicates the check region information and the processing method corresponding to the processing code acquired from the processing instruction region 32. The processing instruction information 1103 indicates the check region information and the processing method corresponding to the processing code acquired from the processing instruction region 33. The thumbnail image 1100 is generated from the processing instruction sheet illustrated in FIG. 2B acquired by the thumbnail generation process. As described above, the thumbnail image is the image data in which the rectangles written in by the checker on the processing instruction sheet to instruct processing have been deleted and in which the rectangles are drawn using the instruction color according to the processing instruction information. Such image data is reduced to be included in the scan ticket and thus becomes the thumbnail image 1000.

The instruction color change process will be described in detail with reference to FIGS. 10 and 11.

Figure 11A:
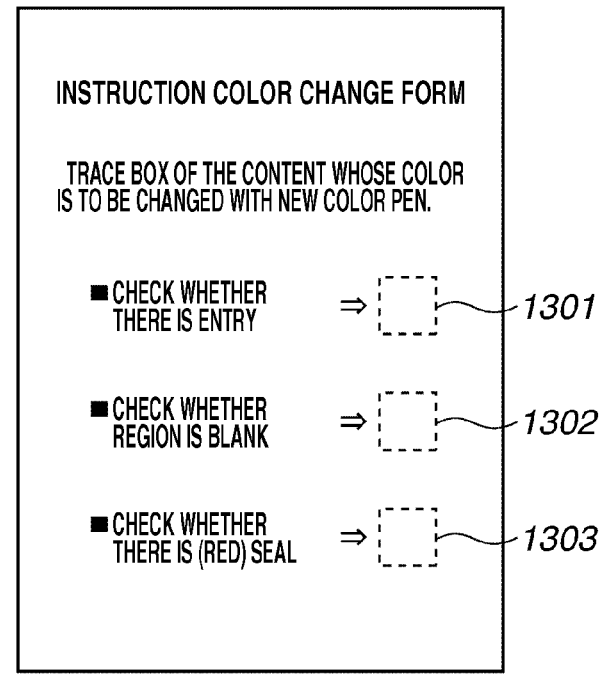
FIGS. 11A and 11B illustrate examples of instruction color change forms.
Figure 11B:
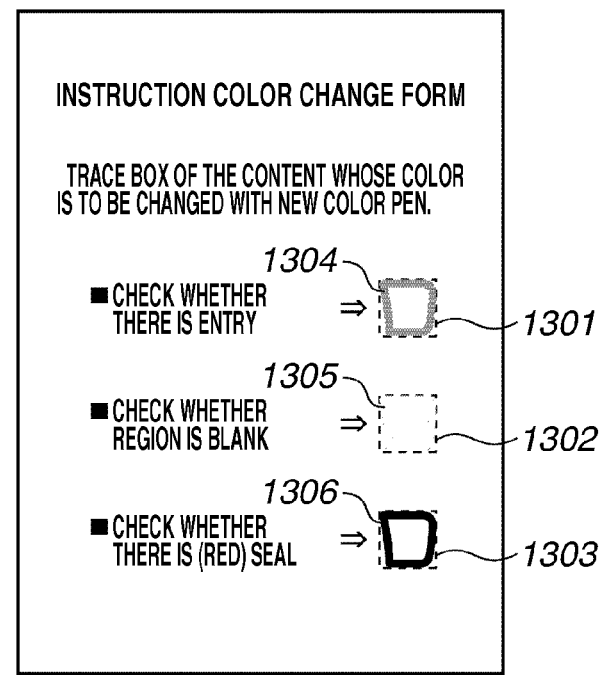

FIG. 10 is a flowchart illustrating the instruction color change process according to the present exemplary embodiment. FIGS. 11A and 11B illustrate examples of an instruction color change form according to the present exemplary embodiment. The process illustrated in the flowchart can be realized by the CPU 11 loading the program stored in the ROM 19 onto the RAM 18 and executing thereon.

In step S1201, upon the user inputting an instruction to the operation unit 16 to perform the instruction color change process, the CPU 11 transmits to the printer 14 the image data of the instruction color change form illustrated in FIG. 11A. The CPU 11 then informs the printer 14 to print the image data. Further, the CPU 11 transmits to the operation unit 16 an instruction to display a message to the user to fill in the instruction color change form with an arbitrary color pen. The instruction color change form contains a plurality of methods for processing the check regions that can be executed by the image processing apparatus 1000, and instruction color designation regions for associating the instruction color with the processing method. A black color (luminance L: 0%) rectangle is drawn around each instruction color designation region. An instruction color designation region 1301 illustrated in FIG. 11A corresponds to a process for checking whether there is an entry in the check region (i.e., processing code: 0). As described above, green (in which the hue H is between 90 degrees and 150 degrees and the saturation S is greater than or equal to 20%) is previously associated with the processing method as the instruction color. An instruction color designation region 1302 corresponds to a process for checking whether the check region is blank (i.e., processing code: 1). Blue (in which the hue H is between 210 degrees and 270 degrees and the saturation S is greater than or equal to 20%) is previously associated with the processing method as the instruction color. An instruction color designation region 1303 corresponds to a process for checking whether there is a red seal in the check region (i.e., processing code: 2). Red (in which the hue H is between 30 degrees and 330 degrees and the saturation S is greater than or equal to 20%) is previously associated with the processing method as the instruction color.

In step S1202, the CPU 11 transmits to the operation unit 16 an instruction to display a message to the user to scan the instruction color change form which the user has filled in using an arbitrary color pen.

In step S1203, the CPU 11 transmits instructions to the scanner 15 to read the instruction color change form and to the HDD 13 to store the image data.

In step S1204, the CPU 11 acquires from the HDD 13 the read image data of the instruction color change form and acquires the color information from the image data of the instruction color designation region. FIG. 11B illustrates an example of the instruction color change form which the user has filled in using the arbitrary color pen and which has been read by the scanner 15. Referring to FIG. 11B, the instruction color change regions in the instruction color change form include regions 1304, 1305, and 1306 drawn using the color pens. The color information can be converted to the HLS color space after detecting the pixels of a color other than the color of the rectangle drawn around the instruction color designation region and acquiring an average value of the pixels in the RGB color space. According to the present exemplary embodiment, the background color is ideally white, which is (255, 255, 255) in the RGB color space, and whose luminance L is 100% and saturation is 0% in the HLS color space. Further, the color of the rectangle drawn around the instruction color designation region is black, which is (0, 0, 0) in the RGB color space, and whose luminance L and saturation are 0% in the HLS color space. It is not necessary for the color of the rectangle drawn around the instruction color designation region to be black.

In step S1205, the CPU 11 determines whether the color information has been read from all of the plurality of the instruction color designation regions. If the color information has been read from all of the plurality of the instruction color designation regions (YES in step S1205), the process proceeds to step S1206. If the color information has not been read from all of the plurality of the instruction color designation regions (NO in step S1205), the process returns to step S1204.

In step S1206, the CPU 11 determines whether there is an invalid color among the read color information. The color is determined as invalid if the colors within the instruction color designation region are only the background color and the color of the rectangle drawn around the instruction color designation region. Further, the color is determined as invalid if the read color information is similar to the above-described two colors. If the CPU 11 determines that there is at least one invalid color among the read color information (YES in step S1206), the process proceeds to step S1207. On the other hand, if there is no invalid color (NO in step S1206), the process proceeds to step S1208. According to the present exemplary embodiment, white (i.e., the luminance L is 100% and the saturation S is 0%) and black (i.e., the luminance L and the saturation S are 0%) are invalid instruction colors. The colors whose saturation is less than or equal to 10% and whose luminance L is between 10% and 90% are thus determined to be colors which are similar to the above-described colors.

In step S1207, the CPU 11 transmits to the operation unit 16 an instruction to display a message to the user to select whether to repeat the instruction color change process. Upon receiving an instruction to repeat the process from the operation unit 16 (YES in step S1207), the CPU 11 replaces the invalid color information with a preset instruction color. The process then proceeds to step S1208. More specifically, if the invalid color is read from the instruction color designation region 1301, a process to be described below is performed by setting as the read color information a value at the center of the range of the hue H of the green color. Green is preset to the processing method corresponding to the instruction color designation region 1301.

In step S1208, the CPU 11 determines whether there are similar colors among the plurality of color information. If there are similar colors (YES in step S1208), the process proceeds to step S1209. If there are no similar colors (NO in step S1208), the process proceeds to step S1211. According to the present exemplary embodiment, if the hue H of each of the color information is within ±30 degrees, the CPU 11 determines that there are similar colors. The ±30 degrees value is a predetermined value used by the image processing apparatus 100 to determine similar colors.

In step S1209, the CPU 11 transmits to the operation unit 16 an instruction to display a message to the user to select whether to repeat the instruction color change process. Upon receiving an instruction to repeat the process from the operation unit 16 (YES in step S1209), the process returns to step S1201. On the other hand, if the CPU 11 determines that an instruction is received to not repeat the process (NO in step S1209), the process proceeds to step S1210.

In step S1210, the CPU 11 reduces the range of the hue H for determining the set instruction color to which the color information is determined to be similar among the plurality of color information.

In step S1211, the CPU 11 enlarges the range of the plurality of color information acquired from the instruction color designation region to a predetermined range. The CPU 11 then sets each of the plurality of color information as the instruction color corresponding to the respective processing method and changes the instruction colors. According to the present exemplary embodiment, the instruction color is determined by setting the hue H in the color information to a range of ±30 degrees and the saturation S in the color information to be greater than or equal to 20%. If the color information is of the instruction color whose range is reduced in step S1210, the range of the hue H is reduced from ±30 degrees. The instruction color is then set so that similar colors do not overlap.

For example, in the instruction color change form illustrated in FIG. 11B, the region 1304 is drawn using an orange color pen (i.e., hue H is 30 degrees, saturation S is 100%, and luminance L is 100%). Further, the region 1305 is drawn using a yellow color pen (i.e., hue H is 60 degrees, saturation S is 100%, and luminance L is 100%), and the region 1306 is drawn using a purple color pen (i.e., hue H is 270 degrees, saturation S is 100%, and luminance L is 100%). The CPU 11 then reads the color information of the regions 1304, 1305, and 1306 in step S1204, and in step S1208, the CPU 11 determines that orange and yellow are similar colors. If the user does not select to repeat the process in step S1209, the process proceeds to step S1210, and the CPU 11 reduces the setting ranges of the hue of each color to ±15 degrees. In step S1211, the CPU 11 changes the instruction colors to correspond to the above-described colors. In other words, orange (i.e., hue H is greater than or equal to 15 degrees and less than 45 degrees, and saturation S is greater than or equal to 20%) becomes the instruction color associated with the process for checking whether there is an entry in the check region (processing code: 0). Further, yellow (i.e., hue H is greater than or equal to 45 degrees and saturation S is greater than or equal to 20%) becomes the instruction color associated with the process for checking whether the check region is blank (processing code: 1). Furthermore, purple (i.e., hue H is between 240 degrees and 300 degrees and saturation S is greater than or equal to 20%) becomes the instruction color associated with the process for checking whether there is a red seal in the check region (processing code: 2).

As described above, according to the first exemplary embodiment, the user fills in the instruction color change form by hand using arbitrary color pens, so that the instruction colors corresponding to a plurality of processing methods can be collectively changed. As a result, user-friendliness is improved. Further, since the user writes on an actual paper by hand using arbitrary color pens, and the scanner reads the paper to change the instruction color, various color pens can be used. Furthermore, the apparatus can accurately determine the instruction colors when the apparatus acquires the processing instruction information.

According to the present exemplary embodiment, the processing instruction information is converted to the QR code in the scan ticket generation process. However, the method for encoding the processing instruction information is not limited to the above, and, for example, a color bar code can be used for encoding. In such a case, the processing instruction information is acquired by performing a decoding process corresponding to the encoding method instead of decoding the QR code in step S2506 illustrated in FIG. 4.

A second exemplary embodiment of the present invention is different from the first exemplary embodiment in a portion of the scan ticket generation process illustrated in FIG. 3. Description on the portions which are similar to the first exemplary embodiment is thus omitted, and only the different portion will be described.

Figure 12:
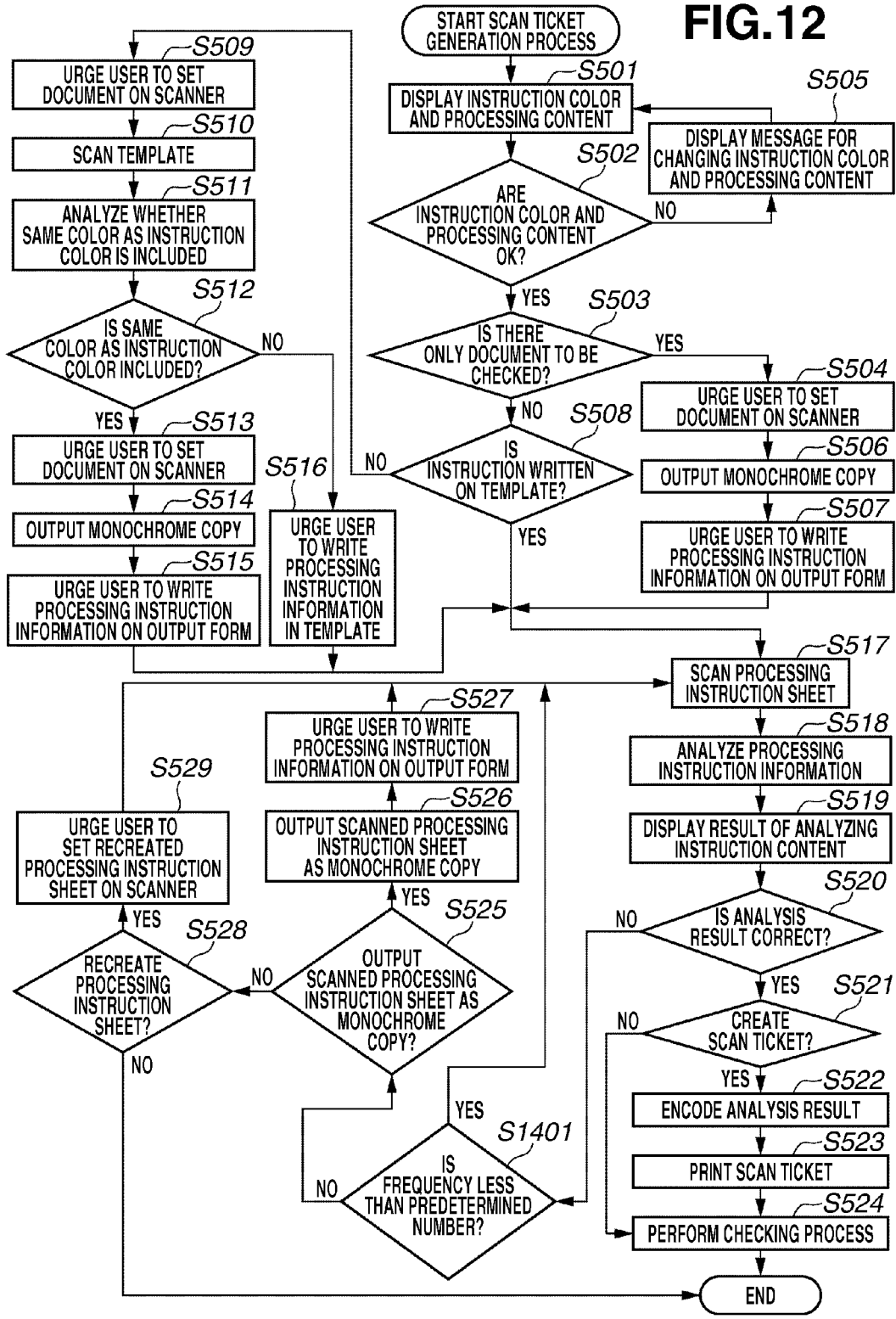
FIG. 12 is a flowchart illustrating a scan ticket generation process.

FIG. 12 is a flowchart illustrating the scan ticket generation process according to the present exemplary embodiment. The scan ticket generation process according to the present exemplary embodiment will be described below with reference to FIG. 12.

According to the present exemplary embodiment, an automatic calibration function of the instruction color is added to the scan ticket generation process illustrated in FIG. 3 described in the first exemplary embodiment. Since step S501 to step S519 are similar to those in the first exemplary embodiment, description will be omitted.

In step S520, the CPU 11 receives from the operation unit 16 a determination result of whether the processing instruction information is correct. If the processing instruction information is correct (YES in step S520), the process proceeds to step S521. If the processing instruction information is incorrect (NO in step S520), the process proceeds to step S1401.

In step S1401, the CPU 11 counts a frequency of the determination by the user that the processing instruction information is not correct in step S520 and determines whether the frequency is less than a predetermined number. If the frequency is less than the predetermined number (YES in step S1401), the process returns to step S517. In step S517, the CPU 11 repeats performing the scan ticket generation process. On the other hand, if the frequency is greater than or equal to the predetermined number (NO in step S1401), the process proceeds to step S525. The predetermined number is previously set to a frequency such as five times. However, the user can separately set the number.

In step S523, the CPU 11 generates the image data of the scan ticket including the instruction processing information acquired in step S518, the QR code converted in step S522, and the thumbnail image generated in step S519. The CPU 11 then transmits to the printer 14 the image data of the generated scan ticket together with an instruction to print the image data. The scan ticket generation process thus ends.

As described above, according to the second exemplary embodiment, the frequency of errors occurring in acquiring the processing instruction information is counted. If the frequency becomes greater than or equal to a predetermined number, the apparatus automatically performs the instruction color change process. As a result, high accuracy of acquiring the instruction color information can be maintained.

The present invention can also be achieved by providing a storage medium which stores software (program code) for implementing functions of the above-described exemplary embodiments. The program code stored in the storage medium can be read and executed by a computer. In this case, the software (program code) itself realizes the functions of the above-described exemplary embodiments. The software (program code) itself and the storage medium that stores the software (program code) constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-056317 filed Mar. 10, 2009, which is hereby incorporated by reference herein in its entirety.

What is claimed is:

1. An apparatus comprising:
a change unit configured to change a combination of a color used to designate a region to be processed by encircling the region by hand and a content of processing to be performed inside an encircled region on a processing instruction sheet on which processing instruction information is written for instructing to perform processing on a document to be processed;
an input unit configured to input image data by reading the processing instruction sheet;
a recognition unit configured to analyze the designated region to be processed and a color used for encircling the designated region by handwriting portion and to recognize a content of processing to be performed inside the analyzed region encircled with the analyzed color according to the combination of the color and the content.

2. The image processing apparatus according to claim 1, wherein the changing unit outputs a change form received from the reading unit for instructing the change, in which an instruction to change the association is written, acquires color information of the region drawn round by hand from the change form, and changes the association.

3. The image processing apparatus according to claim 2, wherein the changing unit provides a display, when acquiring the color information, for a user to select whether to again change the association if the color of the output change form is a color in a range set in the apparatus as the color of the region drawn round by hand in the change form.

4. The image processing apparatus according to claim 2, wherein the changing unit reduces, when acquiring the color information, a color range indicated by a color whose association with the content of processing is to be changed again or has been changed, if there are at least two colors among a plurality of colors used in the region drawn round by hand in the change form which are within the set range for determining similar colors.

5. The image processing apparatus according to claim 1, wherein the changing unit changes the association only when it is determined that a recognized result is not correct a predetermined number of times.

6. An image processing method comprising:
changing a combination of a color used to designate a region to be processed by encircling the region by hand and a content of processing to be performed inside an encircled region on a processing instruction sheet on which processing instruction information is written for instructing to perform processing on a document to be processed;
inputting image data by reading the processing instruction sheet;
analyzing the designated region to be processed and a color used for encircling the designated region by handwriting portion;

recognizing a content of processing to be performed inside the analyzed region encircled with the analyzed color according to the combination of the color and the content.

7. The image processing method according to claim 6, further comprising:
   outputting a change form for instructing the change;
   receiving the change form in which an instruction to change the association is written;
   acquiring color information of the region drawn round by hand from the change form; and
   changing an association.

8. The image processing method according to claim 7, further comprising providing a display, when acquiring the color information, for a user to select whether to again change the association if the color of the output change form is a color in a set range as a color of the region drawn round by hand in the change form.

9. The image processing method according to claim 7, further comprising reducing, when acquiring the color information, a color range indicated by a color whose association with the content of processing is to be changed again or has been changed, if there are at least two colors among a plurality of colors used in the region drawn round by hand in the change form which are within the set range for determining similar colors.

10. The image processing method according to claim 6, further comprising changing the association only when it is determined that a recognized result is not correct a predetermined number of times.

11. A non-transitory computer-readable storage medium storing a program for causing a computer to execute the image processing method according to claim 6.

12. The non-transitory computer-readable storage medium according to claim 11, further comprising:
   outputting a change form for instructing the change;
   receiving the change form in which an instruction to change the association is written;
   acquiring color information of the region drawn round by hand from the change form; and
   changing an association.

13. The non-transitory computer-readable storage medium according to claim 12, further comprising providing a display, when acquiring the color information, for a user to select whether to again change the association if the color of the output change form is a color in a set range as a color of the region drawn round by hand in the change form.

14. The non-transitory computer-readable storage medium according to claim 12, further comprising reducing, when acquiring the color information, a color range indicated by a color whose association with the content of processing is to be changed again or has been changed, if there are at least two colors among a plurality of colors used in the region drawn round by hand in the change form which are within the set range for determining similar colors.

15. The non-transitory computer-readable storage medium according to claim 11, further comprising changing the association only when it is determined that a recognized result is not correct a predetermined number of times.

* * * * *